(12) United States Patent
Choi et al.

(10) Patent No.: US 8,187,769 B2
(45) Date of Patent: May 29, 2012

(54) SUPPORTED CATALYST FOR FUEL CELL, METHOD OF PREPARING THE SAME, ELECTRODE FOR FUEL CELL INCLUDING THE SUPPORTED CATALYST, MEMBRANE ELECTRODE ASSEMBLY INCLUDING THE ELECTRODE, AND FUEL CELL INCLUDING THE MEMBRANE ELECTRODE ASSEMBLY

(75) Inventors: Dong Woong Choi, Incheon (KR); Dong Hwal Lee, Incheon (KR); Dong Il Kim, Incheon (KR)

(73) Assignee: Dongjin Semichem Co., Ltd. (KR)

( * ) Notice: Subject to any disclaimer, the term of this patent is extended or adjusted under 35 U.S.C. 154(b) by 1343 days.

(21) Appl. No.: 11/782,469

(22) Filed: Jul. 24, 2007

(65) Prior Publication Data

US 2009/0042089 A1 Feb. 12, 2009

(30) Foreign Application Priority Data

Jul. 24, 2006 (KR) .................. 10-2006-0069274

(51) Int. Cl.
- H01M 4/02 (2006.01)
- H01M 4/36 (2006.01)
- H01M 4/92 (2006.01)
- H01M 4/94 (2006.01)
- H01M 4/90 (2006.01)

(52) U.S. Cl. ........ 429/532; 439/523; 439/524; 439/525; 439/526; 439/528

(58) Field of Classification Search .............. None
See application file for complete search history.

(56) References Cited

U.S. PATENT DOCUMENTS

| | | | |
|---|---|---|---|
| 4,447,506 A | 5/1984 | Luczak et al. ............. | 429/44 |
| 4,822,699 A | 4/1989 | Wan ......................... | 429/40 |
| 5,512,094 A * | 4/1996 | Linton ...................... | 106/409 |
| 2002/0125146 A1 | 9/2002 | Chan et al. | |
| 2005/0112451 A1* | 5/2005 | Lee et al. ................. | 429/44 |
| 2006/0188775 A1* | 8/2006 | Mance et al. ............. | 429/44 |
| 2006/0263675 A1* | 11/2006 | Adzic et al. .............. | 429/44 |

FOREIGN PATENT DOCUMENTS

| | | |
|---|---|---|
| CN | 1404178 A | 3/2003 |
| CN | 101156265 A | 4/2008 |

(Continued)

OTHER PUBLICATIONS

Extended European Search Report, Oct. 18, 2007, 6 pages.

(Continued)

*Primary Examiner* — Emily Le
*Assistant Examiner* — Michael Forrest
(74) *Attorney, Agent, or Firm* — St. Onge Steward Johnston & Reens LLC

(57) ABSTRACT

Provided are a supported catalyst for a fuel cell, a method of preparing the same, an electrode for a fuel cell including the supported catalyst, a membrane electrode assembly including the electrode, and a fuel cell including the membrane electrode assembly. Specifically, the supported catalyst for a fuel cell has a layered structure obtained by sequentially depositing a carbonaceous support, metal oxide particles, and catalyst metal. The supported catalyst has excellent electrical activity, excellent durability, and can be easily mass-produced at low cost. The membrane electrode assembly including the supported catalyst and a fuel cell including the membrane electrode assembly each show excellent output density and high performance.

14 Claims, 10 Drawing Sheets

FOREIGN PATENT DOCUMENTS

| | | | |
|---|---|---|---|
| GB | 2024868 | A | 1/1980 |
| JP | 59225740 | A | 12/1984 |
| JP | 2005150085 | A | 6/2005 |
| JP | 2005270864 | A | 10/2005 |
| JP | 2006134613 | A | 5/2006 |
| WO | 2006091443 | A2 | 8/2006 |

OTHER PUBLICATIONS

Chinese Office Action, Application No. 2007101390404, Jan. 16, 2009, 16 pages.

Xinchen Wang et al., "A Mesoporous Pt/TiO2 Naniarchitecture with Catalytic and Photocatalytic Functions", 2005, 8 pages.

Changwei Xu et al., Journal of Power Sources "Electrochamical Oxidation of Ethanol on Pt-CeO2/C Catalysts", 2005, 3 pages.

Luhua Jiang et al., "Size-Controllable Synthesis of Monodispersed SnO2 Nanoparticles and Application in Electrocatalysts", 2005, 5 pages.

Pei Kang Shen et al., ECS "Electro—Oxidation of Methanol on NiO-Promoted Pt/C and Pd/C Catalysts", 2005, 4 pages.

* cited by examiner

SUPPORTED CATALYST FOR FUEL CELL, METHOD OF PREPARING THE SAME, ELECTRODE FOR FUEL CELL INCLUDING THE SUPPORTED CATALYST, MEMBRANE ELECTRODE ASSEMBLY INCLUDING THE ELECTRODE, AND FUEL CELL INCLUDING THE MEMBRANE ELECTRODE ASSEMBLY

CROSS-REFERENCE TO RELATED APPLICATIONS

This application claims the benefit of Korean Patent Application No. 10-2006-0069274, filed on Jul. 24, 2006, in the Korean Intellectual Property Office, the disclosure of which is incorporated herein in its entirety by reference.

FIELD OF THE INVENTION

The present invention relates to a supported catalyst for a fuel cell, a method of preparing the same, an electrode for a fuel cell including the supported catalyst, a membrane electrode assembly including the electrode, and a fuel cell including the membrane electrode assembly, and particularly, to a supported catalyst for a fuel cell having excellent electrical activity and excellent durability that can be easily mass-produced at low cost and provides excellent output density, a method of preparing the same, an electrode for a fuel cell including the supported catalyst, a membrane electrode assembly including the electrode, and a fuel cell including the membrane electrode assembly.

BACKROUND OF THE INVENTION

As technology develops, demands for high-capacity power sources are ever increasing. However, conventional lithium secondary batteries do not satisfy such demands, and have some problems. For example, conventional lithium secondary batteries should be recharged after being used for a short period of time, and have short lifetimes. To solve these problems, a fuel cell that is environmentally friendly and has high energy densities and a long lifetime is considered to be a next-generation power source.

According to an electrolyte used, fuel cells are categorized into polymer electrolyte membrane fuel cells (PEMFCs), phosphoric acid fuel cells (PAFCs), molten carbonate fuel cells (MCFCs), and solid oxide fuel cells (SOFCs). According to an electrolyte used, fuel cells may operate at a varying temperature and include various materials. According to a method of supplying a fuel to an anode, fuel cells can be categorized into an external reformation-type fuel cell in which a fuel is converted into hydrogen-rich gas by a fuel reformer and thereafter the hydrogen-rich gas is supplied to an anode, and a fuel direct supply-type or an inner reformation-type fuel cell in which gas fuel or liquid fuel is directly supplied to an anode. Examples of a fuel direct supply-type fuel cell include a direct methanol fuel cell (DMFC.) In general, a DMFC uses a methanol aqueous solution as a fuel, and a proton conductive polymer electrolyte as an electrolyte. Accordingly, the DMFC can also be a PEMFC. The PEMFC can obtain high output density even when the PEMFC is miniaturized and lightweight. In addition, the PEMFC may provide a simple energy generation system.

In general, a fuel cell has a basic structure including an anode (fuel cell), a cathode (oxidant electrode), and a polymer electrolyte disposed between the anode and the cathode. The anode includes a catalyst layer for catalyzing the oxidation of a fuel. The cathode includes a catalyst layer for catalyzing the reduction of an oxidant. In the anode, a fuel is oxidized to generate protons and electrons, and the generated protons flow to the cathode through the electrolyte and the generated electrons flow to an external circuit (load) through a conducting line or a current collector. In the cathode, the hydrogen ions that have flown through the electrolyte, and the electrons that have flown from the external circuit through a conducting line or a current collector, and oxygen are combined together to generate water. At this time, the flow of electrons through, the anode, the external circuit, and the cathode is called an electric force. As described above, at least one of the cathode and anode of a fuel cell includes a catalyst catalyzing at least one of electrochemical oxidation of a fuel and electrochemical reduction of oxygen.

In general, expensive metal is used as a catalyst in the anode and cathode of a fuel cell. Accordingly, research into how to decrease the amount of expensive catalyst used is being carried out. For example, Pt—Ru, Pt—Sn, and Pt—W alloys have been developed as a catalyst for catalyzing the electrochemical oxidation of a fuel, that is, a catalyst for an anode; and Pt—Cr—Co, Pt—Ni, and Pt—Cr alloys have been developed as a catalyst for catalyzing the electrochemical oxidation of oxygen, that is, a catalyst for a cathode. For example, U.S. Pat. No. 4,447,506 discloses Pt—Cr—Co and Pt—Cr alloy catalysts, and U.S. Pat. No. 4,822,699 discloses Pt—Ga and Pt—Cr alloy catalysts.

Meanwhile, the amount of expensive metal used can be decreased using metal oxide in a catalyst. For example, experimental results obtained using $SnO_2$ (J. Phys. Chem. B 2005, 109, 8774-8778), $CeO_2$ (Journal of Power Sources 142 (2005) 27-29), $TiO_2$ (Chem. Eur. J. 2005, 11, 2997. 3004), and NiO (Electrochemical and Solid-State Letters, 9 2A39-A42 2006) have been disclosed.

However, there is still a need to develop a supported catalyst for a fuel cell having excellent electrical activity and excellent durability which can be mass-produced and provides excellent output density

SUMMARY OF THE INVENTION

The present invention provides to a supported catalyst for a fuel cell providing excellent electrical activity and excellent durability which can be easily mass-produced at low cost and provides excellent output density, a method of preparing the same, an electrode for a fuel cell including the supported catalyst, a membrane electrode assembly including the electrode, and a fuel cell including the membrane electrode assembly.

According to an aspect of the present invention, there is provided a supported catalyst having a layered structure obtained by sequentially depositing a carbonaceous support, metal oxide, and catalyst metal.

According to another aspect of the present invention, there is provided method of preparing a supported catalyst for a fuel cell, the method including: preparing a strong acid or base solution which contains a carbonaceous support and a metal oxide precursor solution; heating and stirring the strong acid or base solution to prepare a catalyst support solution in which metal oxide is supported by the carbonaceous support; dropping a catalyst metal precursor solution to the catalyst support solution and then mixing the resultant solution, thereby preparing a blend solution; reducing the blend solution; and refining and drying the reduced product.

According to another aspect of the present invention, there is provided an electrode for a fuel cell including the supported catalyst.

According to another aspect of the present invention, there is provided a membrane electrode assembly including the electrode According to another aspect of the present invention, there is provided a fuel cell including the membrane electrode assembly.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

The present invention will now be described more fully with reference to the accompanying drawings, in which exemplary embodiments of the invention are shown.

A supported catalyst for a fuel cell according to an embodiment of the present invention has excellent electrical activity and excellent durability, can be easily mass-produced at low cost, and provides excellent output density.

The supported catalyst has a layered structure obtained by sequentially depositing a carbonaceous support, a metal oxide, and a catalyst metal.

The catalyst metal of the supported catalyst catalyzes the electrochemical oxidation and reduction reactions occurring in a fuel cell. For example, for in an anode of a direct methanol fuel cell, methanol is electrochemically oxidized at the surface of the catalyst metal to thereby generate protons and electrons, and in contrast, in a cathode, oxygen is reduced. The protons and electrons generated resulting from oxidation of methanol in the anode flow to the cathode through an electrolyte and an external circuit, and the protons flowed to the cathode are joined in the electrochemical reduction of oxygen to form water. At this time, the cathode and the anode have different electromotive forces and thus, a voltage is formed. Reactions occurring in the cathode and anode of a fuel cell may be represented by Reaction Scheme 1:

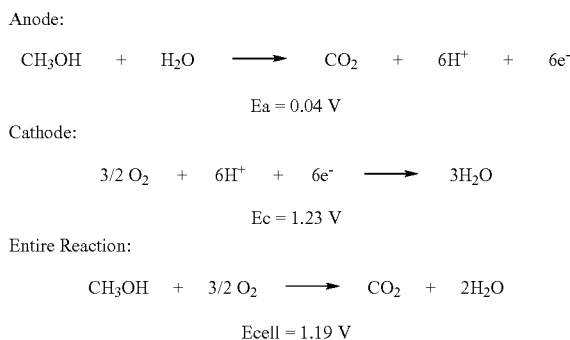

[Reaction Scheme 1]

Anode:
$$CH_3OH + H_2O \longrightarrow CO_2 + 6H^+ + 6e^-$$
$$Ea = 0.04 \text{ V}$$

Cathode:
$$3/2\, O_2 + 6H^+ + 6e^- \longrightarrow 3H_2O$$
$$Ec = 1.23 \text{ V}$$

Entire Reaction:
$$CH_3OH + 3/2\, O_2 \longrightarrow CO_2 + 2H_2O$$
$$Ecell = 1.19 \text{ V}$$

The supported catalyst for a fuel cell according to the present invention shows high activity with respect to electrochemical oxidation and reduction reactions, since even when the amount of catalyst metal supported is large, the catalyst metal can be formed in fine particles on the metal oxide. Specifically, the metal oxide may support the catalyst metal and ensure uniform distribution of the catalyst metal and uniform surface morphology of the supported catalyst, thereby contributing to an increase in activity of the supported catalyst.

Figure 1:
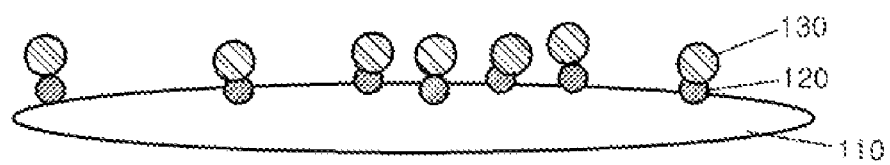
FIG. 1 is a schematic sectional view of a supported catalyst including a carbonaceous support, metal oxide, and catalyst metal, according to an embodiment of the present invention.

FIG. 1 is a schematic sectional view of a supported catalyst having a layered structure obtained by sequentially depositing a carbonaceous support 110, a metal oxide 120, and a catalyst metal 130 according to an embodiment of the present invention. Referring to FIG. 1, the supported catalyst includes a first layer formed of the carbonaceous support 110, a second layer formed of the metal oxide 120 on the first layer, and a third layer formed of the catalyst metal 130 on the second layer.

In the supported catalyst according to the present invention, the carbonaceous support and the metal oxide ensure a uniform distribution of the catalyst metal. Specifically, the metal oxide provides hydrophilic properties to the supported catalyst and minimizes an agglomeration phenomenon of the catalyst metal occurring when the catalyst metal is supported by the supported catalyst. As a result, the catalyst metal can be uniformly distributed at the surface of the carbonaceous support. When the catalyst metal is uniformly distributed at the surface of the carbonaceous support, the catalyst metal has a large surface area and thus the supported catalyst may have high activity.

In addition, since the supported catalyst according to the present invention has a stack structure formed by sequentially depositing the carbonaceous support, the metal oxide, and the catalyst metal, the supported catalyst according to the present invention shows higher catalyst activity than a supported catalyst in which a carbonaceous support, metal oxide, and catalyst metal are simply mixed. Such higher activity may be due to an increase in a reaction area in which a fuel contacts the catalyst metal.

In the current embodiment, the carbonaceous support can be, but is not limited to, a carbonaceous support that has porosity, can have a surface area of more than 150 $m^2/g$, specifically from 500 to 1200 $m^2/g$, and can have an average particle diameter of 10 to 300 nm, specifically from 20 to 100 nm. When the surface area of the carbonaceous support is smaller than 150 m$^2$/g, the carbonaceous support may insufficiently support the catalyst metal.

A carbonaceous support satisfying such conditions described above may include at least one material selected from the group consisting of carbon black, ketjen black, acetylene black, active carbon powder, carbon molecular sieves, carbon nanotubes, activated carbon having pores, and mesoporous carbon.

The catalyst metal may include at least one metal selected from the group consisting of a main catalyst metal, an alloy of a main catalyst metal and a co-catalyst metal, and a main catalyst metal doped with a co-catalyst metal.

The main catalyst metal may directly catalyze the electrochemical oxidation and reduction reactions of a fuel cell. The main catalyst metal can be, but is not limited to, Pt, Au, Ru, or Os. For example, the main catalyst metal can be Pt.

The co-catalyst metal may improve electrical activity of the main catalyst metal. The co-catalyst metal may include at least one metal selected from the group consisting of Ce, Ru, Sn, W, Ti, Mo, Fe, V, Mn, Co, Cr, Ni, Pd, Rh, and Ir.

When the catalyst metal is an alloy of a main catalyst metal and a co-catalyst metal, or a main catalyst metal doped with the co-catalyst metal, the atomic ratio of the main catalyst metal to the co-catalyst metal may be in the range from 1:9 to 9:1, and the weight ratio of the main catalyst metal to the co-catalyst metal may be in the range from 0.3 to 20, more specifically 0.7 to 7.

When the amount of the main catalyst metal is too large, the manufacturing costs may increase due to main catalyst metal being expensive. On the other hand, when the amount of the co-catalyst metal is too large, the catalyst metal may show insufficient activity as a catalyst for catalyzing the electrochemical oxidation and reduction reactions of a fuel cell.

The average diameter of particles of the catalyst metal may be in the range from 1.0 to 6.0 nm. When the average particle diameter of the catalyst metal is more than 6.0 nm, performance of the supported catalyst may be decreased. On the other hand, when the average diameter of particles of the catalyst metal is less than 1.0 nm, the supported catalyst may deteriorate.

The amount of the catalyst metal may be in the range from 10 to 1400 parts by weight, specifically from 20 to 400 parts by weight, based on 100 parts by weight of the carbonaceous support.

When the amount of the catalyst metal is less than 10 parts by weight based on 100 parts by weight of the carbonaceous support, it is difficult to obtain sufficient catalyst activity. On the other hand, when the amount of the catalyst metal is more than 1400 parts by weight based on 100 parts by weight of the carbonaceous support, the manufacturing costs may increase.

The metal oxide constituting the supported catalyst together with the carbonaceous support is an oxide represented by $MO_x$ or $MO_xC$ where x is in the range from 1 to 3, and M may include at least one co-catalyst metal selected from the group consisting of Ce, Ru, Sn, W, Ti, Mo, Fe, V, Mn, Co, Cr, Ni, Pd, Rh, and Ir.

The amount of the metal oxide may be in the range from 3 to 650 parts by weight, specifically from 7 to 160 parts by weight, based on 100 parts by weight of the carbonaceous support.

When the amount of the metal oxide is less than 3 parts by weight based on 100 parts by weight of the carbonaceous support, the metal oxide may insufficiently support the catalyst metal. On the other hand, when the amount of the metal oxide is more than 650 parts by weight based on 100 parts by weight of the carbonaceous support, electrical conductivity of the supported catalyst may decrease so that activity of the supported catalyst may decrease.

The average diameter of particles of the metal oxide may be in the range from 1 to 50 nm. When the average diameter of particles of the metal oxide is more than 50 nm, the catalyst metal may not be supported in a well-distributed state. On the other hand, when the average diameter of particles of the metal oxide is less than 1 nm, the reaction area of the active catalyst metal may decrease significantly.

A method of preparing a supported catalyst for a fuel cell according to an embodiment of the present invention includes: preparing a strong acid or base solution which contains a carbonaceous support and a metal oxide precursor solution; heating and stirring the strong acid or base solution to prepare a catalyst support solution in which metal oxide is supported by the carbonaceous support; dropping a catalyst metal precursor solution into the catalyst support solution and then mixing the resultant solution, to thereby prepare a blend solution; reducing the blend solution; and refining and drying the reduced product.

That is, in the method of preparing a supported catalyst for a fuel cell according to an embodiment of the present invention, a catalyst support solution in which metal oxide is supported by a carbonaceous support is prepared using a simple process, and then, a catalyst metal precursor solution is dropped into the catalyst support solution to prepare supported catalyst metal. As a result, the supported catalyst for a fuel cell has a stack structure in which the carbonaceous support, metal oxide, and catalyst metal are sequentially deposited. In the method described above, the pH of the catalyst support solution can be easily controlled, loss of micro particles in a refining process can be minimized, and the supported catalyst can be mass-produced at low cost, compared to the case where the metal oxide is synthesized and then the metal oxide is refined and added to the carbonaceous support.

The carbonaceous support may include at least one material selected from the group consisting of carbon black, ketjen black, acetylene black, active carbon powder, carbon molecular sieves, carbon nanotubes, activated carbon having pores, and mesoporous carbon.

The metal oxide precursor solution can be, but is not limited to, a chloride, nitride, oxide, or halide solution of at least one metal selected from the group consisting of Ce, Ru, Sn, W, Ti, Mo, Fe, V, Mn, Co, Cr, Ni, Pd, Rh, and Ir.

The strong acid solution can be prepared using a strong acid, such as a nitric acid, hydrochloric acid, or a blend thereof. The strong base solution can be prepared using a strong base, such as sodium hydroxide, ammonium hydroxide, potassium hydroxide, or a blend thereof. When the strong acid is properly used to prepare the strong acid solution, the pH of the strong acid solution may be in the range from 2 to 4. When the strong acid is appropriately used to prepare the strong base solution, the pH of the strong base solution may be in the range from 11 to 13. When the pHs of the strong acid and base solutions are outside these ranges, the metal oxide may be formed in too small particles so that the metal oxide may be insufficiently supported by the carbonaceous support, or the metal oxide may be formed in too large particles, and the metal oxide may be non-uniformly distributed on the carbonaceous support and agglomerates.

The strong acid or base solution may be heated at 150° C. to 250° C. for 3 to 5 hours. When the heating temperature is too high or too low, the metal oxide may not be formed or even when the metal oxide is formed, the size of the metal oxide may be too large due to an attractive force in the metal oxide.

After the catalyst support in which the metal oxide is supported by the carbonaceous support is prepared, a catalyst metal is deposited on the catalyst support, specifically metal oxide of the catalyst support.

The catalyst metal can be deposited using a precursor solution of catalyst metal. At this time, various solutions can be used according to the kind of a catalyst metal to be supported. For example, when the catalyst metal to be supported is Pt, an available solution can be a tetrachloroplatinum acid ($H_2PtCl_4$), a hexachloroplatinum acid ($H_2PtCl_6$), a potassium tetrachloroplatinum acid ($K_2PtCl_4$), a potassium hexachloroplatinum acid ($K_2PtCl_6$), $Pt(NH_3)_2(NO_2)_2$, $Pt(NH_3)_4Cl_2$, or a blend thereof. When the catalyst metal to be supported is Ru, an available solution can be $(NH_4)_2[RuCl_6]$, $(NH_4)_2[RuCl_5H_2O]$, or $RuCl_3 \cdot 3H_2O$. When the catalyst metal to be supported is Au, an available solution can be $H[AuCl_4]$, $(NH_4)_2[AuCl_4]$, or $H[Au(NO_3)_4]H_2O$. In addition, when the catalyst metal to be supported is an alloy of a main catalyst metal and a co-catalyst metal, or a main catalyst metal doped with a co-catalyst metal, an available solution can be a mixture of a precursor solution having a mixture ratio corresponding to a desired metal atomic ratio.

To mix the catalyst metal precursor solution and the catalyst support solution, the catalyst metal precursor solution may be slowly dropped into and stirred with the catalyst support solution, to thereby obtain a uniform deposition of the catalyst metal on the metal oxide of the catalyst support.

Then, the mixed solution is reduced using a reducing agent. The reducing agent can be, but is not limited to, sodium borohydride; hydrazine; alcohols, such as methanol, ethanol, or ethyleneglycol; or a blend thereof.

The reduced product is refined and dried. As a result, preparation of a supported catalyst for a fuel cell according to the present invention is complete.

A supported catalyst for a fuel cell prepared according to the preparation process described above has a three-layer structure as described above.

The present invention also provides an electrode for a fuel cell including the supported catalyst, a membrane electrode assembly including the electrode, and a fuel cell including the membrane electrode assembly.

The electrode for a fuel cell according to the present invention may include an electrode substrate, the supported catalyst according to the present invention as described above, an electrode diffusion layer, a microporous layer, and the like. A method of forming the electrode will now be described in detail. A carbon powder, such as carbon black, acetylene black, carbon nanotube, carbon nanowire, carbon nanohorn, carbon nanofiber, or the like; a binder, such as polytetrafluoroethylene (PTFE), polyvinylidenefluoride (PVDF), fluorinated ethylene propylene (FEP), or the like; and a dispersing medium, such as water, ethanol, methanol, isopropylalcohol, n-propylalcohol, butylalcohol, or the like are mixed together. The resultant mixture is coated on an electrode substrate, such as a carbon paper, by tape casting, spraying, or screen printing, to form a uniform electrode diffusion layer and a uniform microporous layer. Then, a slurry of the supported catalyst according to the present invention is prepared. The slurry of the supported catalyst is coated on the electrode diffusion layer and the microporus layer by tape casting, spraying, or screen printing.

The electrode diffusion layer may allow easy access of reaction gas to the supported catalyst layer and prevent a decrease in performance of a fuel cell due to water produced as a by-product when a fuel cell operates. The microporus layer may improve the performance of the electrode diffusion layer.

The membrane electrode assembly (MEA) according to the present invention may include an anode, a cathode, and an electrolyte interposed between the anode and the cathode.

Each of the anode and the cathode can be the same as the electrode according to the present invention. The electrolyte can be, in general, a polymer electrolyte, such as a sulfonate perfluorinated polymer having a main chain of a fluorinated alkylene and a side chain of a sulfonated vinyl ether terminated with a sulfonic acid group (Nafion: brand name of Dupont Co.). The polymer electrolyte may show excellent ionic conductivity when impregnated with water. The electrode can be combined with the electrolyte using a thermal pressing method.

The fuel cell including the MEA includes at least one electricity generation unit, a fuel supply unit, and a gas supply unit. The electricity generation unit includes a cathode, an anode, and a separation plate, wherein the cathode and the anode form opposite surfaces of the polymer electrolyte. At this time, the electrode and the separation plate can be formed in a single body using, for example, a metal net. The fuel supply unit supplies hydrogen or a hydrogen-containing fuel, that is, an alcohol, such as methanol, to the electricity generation unit. The gas supply unit may supply oxygen or oxygen-containing air to the electricity generation unit.

Hereinafter, a fuel cell according to an embodiment of the present invention, specifically a direct methanol fuel cell (DMFC), will be described in detail with reference to FIG. 8.

Figure 8:
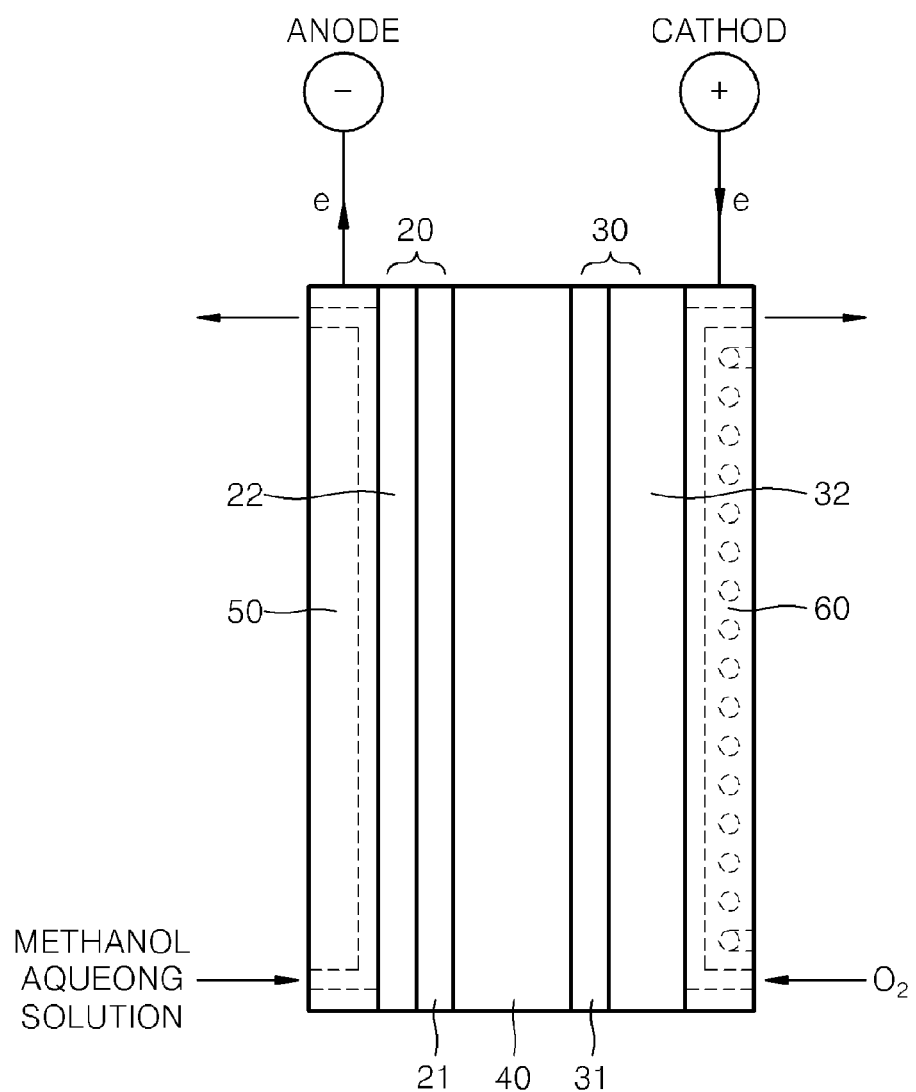
FIG. 8 is a sectional view of a fuel cell according to an embodiment of the present invention.

Referring to FIG. 8, a DMFC may include an anode 20 to which a fuel is supplied, a cathode 30 to which an oxidant is supplied, and an electrolyte 40 interposed between the anode 20 and the cathode 30. In general, the anode 20 may include an anode diffusion layer 22 and an anode catalyst layer 21, and the cathode 30 may include a cathode diffusion layer 32 and a cathode catalyst layer 31. According to the current embodiment, each of the anode catalyst layer and the cathode catalyst layer is the same as the supported catalyst according to the present invention.

An anode separation plate 50 may include a flow channel through which a fuel is supplied to the anode, and acts as an electron conductor transferring electrons generated in the anode to an external circuit or an adjacent unit cell. A cathode separation plate 60 may include a flow channel through which an oxidant is supplied to the cathode, and may act as an electron conductor transferring electrons supplied from the external circuit or adjacent unit cell to the cathode. In a DMFC, a fuel supplied to an anode is, in general, a methanol aqueous solution, and is supplied from a fuel supplying unit, and an oxidant supplied to a cathode is, in general, air, and is supplied from a gas supply unit.

The methanol aqueous solution transferred from the anode catalyst layer 21 through the anode diffusion layer 22 is decomposed into electrons, protons, carbon dioxides, or the like. Protons are transferred to the cathode catalyst layer 31 through the electrolyte 40, electrons are transferred to an external circuit, and carbon dioxides are discharged out of a fuel cell. In the cathode catalyst layer 31, protons which are transferred through the electrolyte 40, electrons which are supplied from the external circuit, and oxygen from air which is transferred through the cathode diffusion layer 32, are reacted together to produce water.

In such a DMFC, the electrolyte 40 may act as a proton conductor, an electron insulator, a separation layer, or the like. Specifically, the electrolyte 40 acts as a separation layer so that flow of an unreacted fuel to the cathode or flow of an unreacted oxidant to the anode can be prevented.

The present invention will be described in further detail with reference to the following examples. These examples are for illustrative purposes only and are not intended to limit the scope of the present invention.

EXAMPLES

Example 1

Preparation of PtNiO/C Containing 60 wt % of PtNi in Atomic Ratio of 1:1

200 ml of ethanol and 50 ml of a nitric acid were mixed in a reaction vessel, 0.597 g of carbon black and 0.926 of nikel chloride ($NiCl_2.6H_2O$) were added thereto, and then 25 ml of distilled water was added to the resultant mixture. Then, the resultant mixture to which distilled water was added was stirred at 240° C. for about 4 hours to obtain NiO/C.

The prepared NiO/C was distributed in deionized water in a reaction vessel, and then, 2.0 g of 99% chloroplatinic acid ($H_2PtCl_6.6H_2O$) was dropped thereto and stirred at room temperature for 12 hours. Then, a solution prepared by dissolving NaOH and sodium borohydride that is a reducing agent in a deionized water was dropped into the reaction vessel and reduced for 12 hours. Then, the reduction product was refined using a deionized water, and then was vacuum-dried at 80° C. As a result, PtNiO/C containing 60 wt % of PtNi in an atomic ratio of 1:1 was prepared.

Figure 2A:
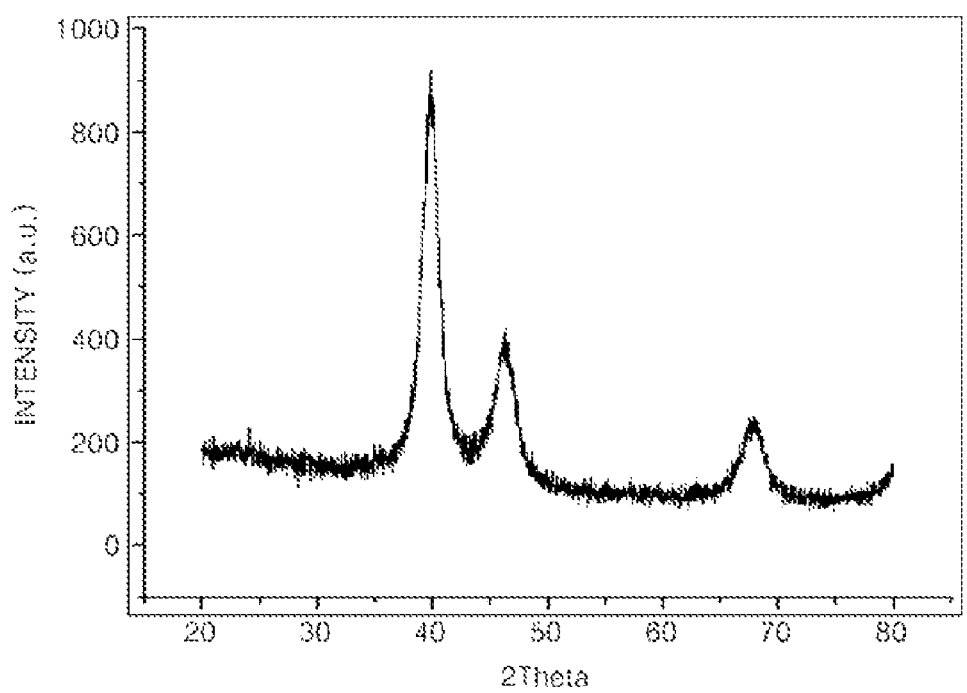
FIG. 2A is a graphical view of an X-ray diffraction (XRD) spectrum of a supported catalyst prepared according to Example 1.
Figure 2B:
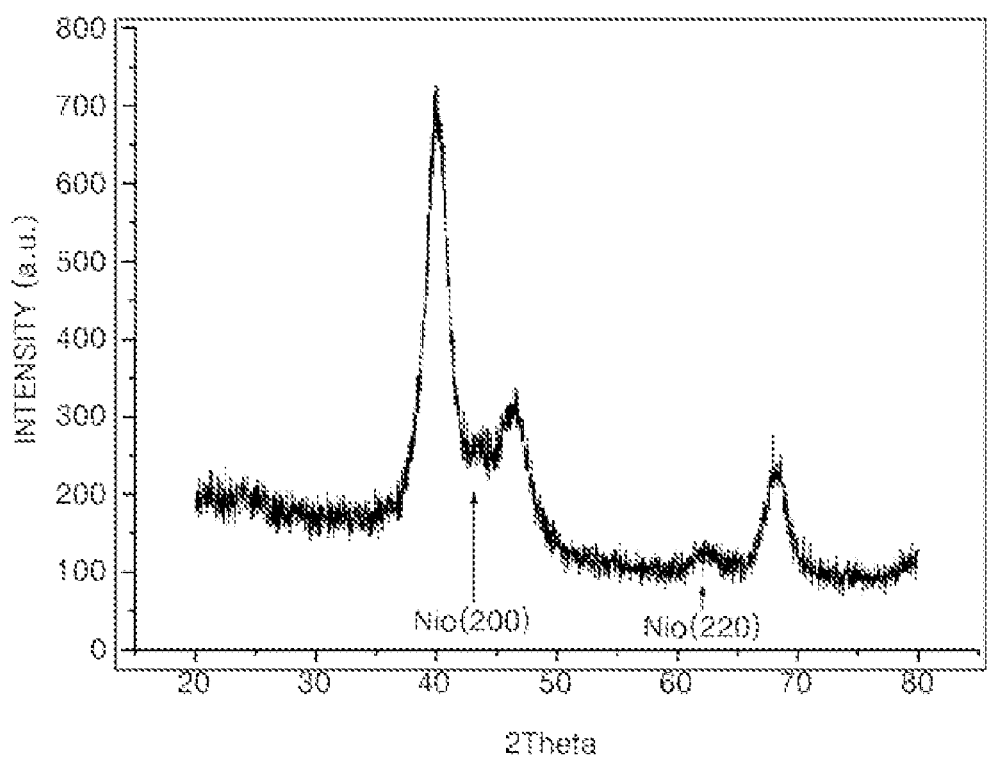
FIG. 2B is a graphical view of an X-ray diffraction (XRD) spectrum of a supported catalyst prepared according to Comparative Example 1.
Figure 4:
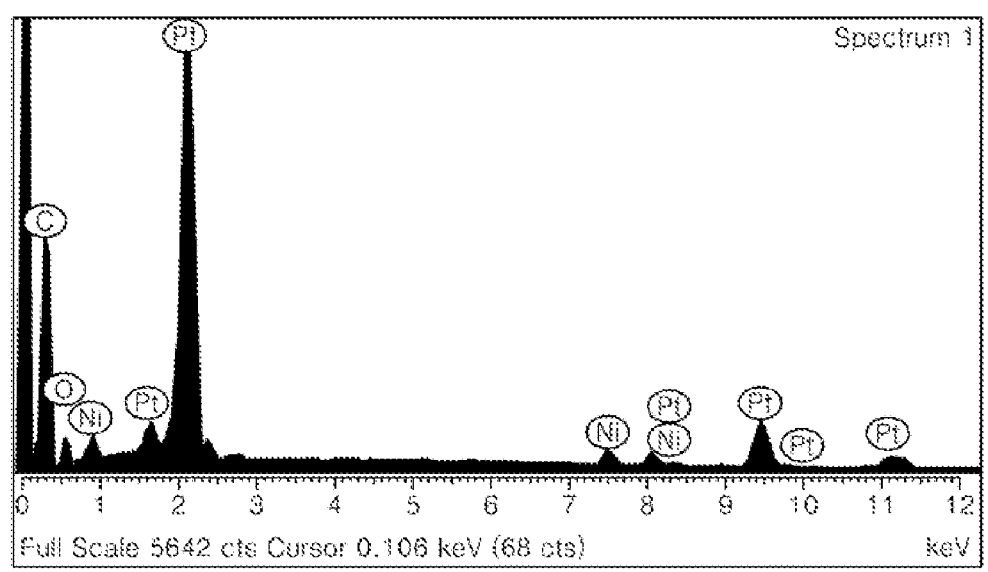
FIG. 4 is a graphical view of a scanning electron microscopy-energy dispersive X-ray (SEM-EDX) spectrum of a supported catalyst prepared according to Example 1.
Figure 5A:
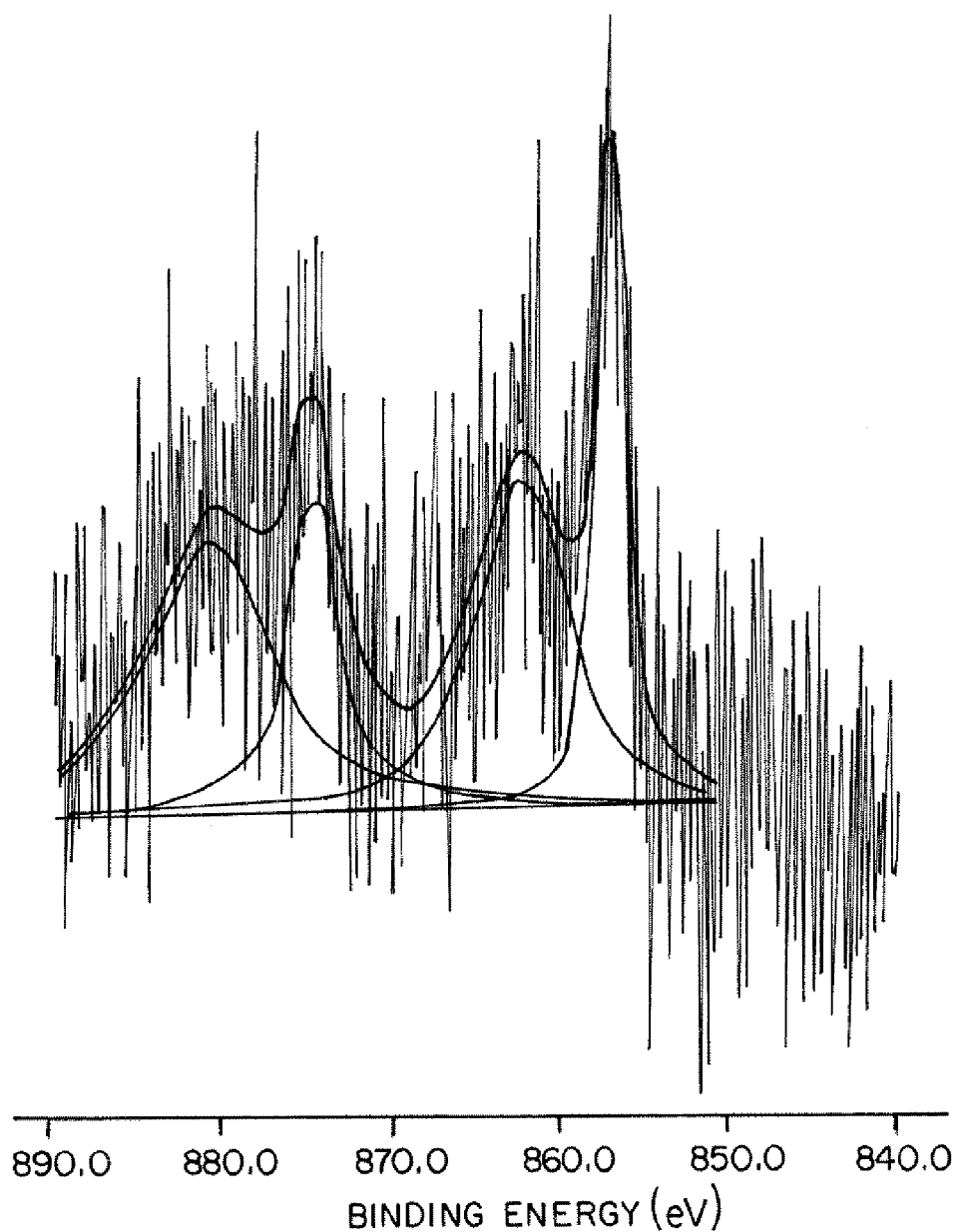
FIG. 5A and 5B is a graphical view of an X-ray photoelectron spectroscopy (XPS) spectrum of a supported catalyst prepared according to Example 1.
Figure 5B:
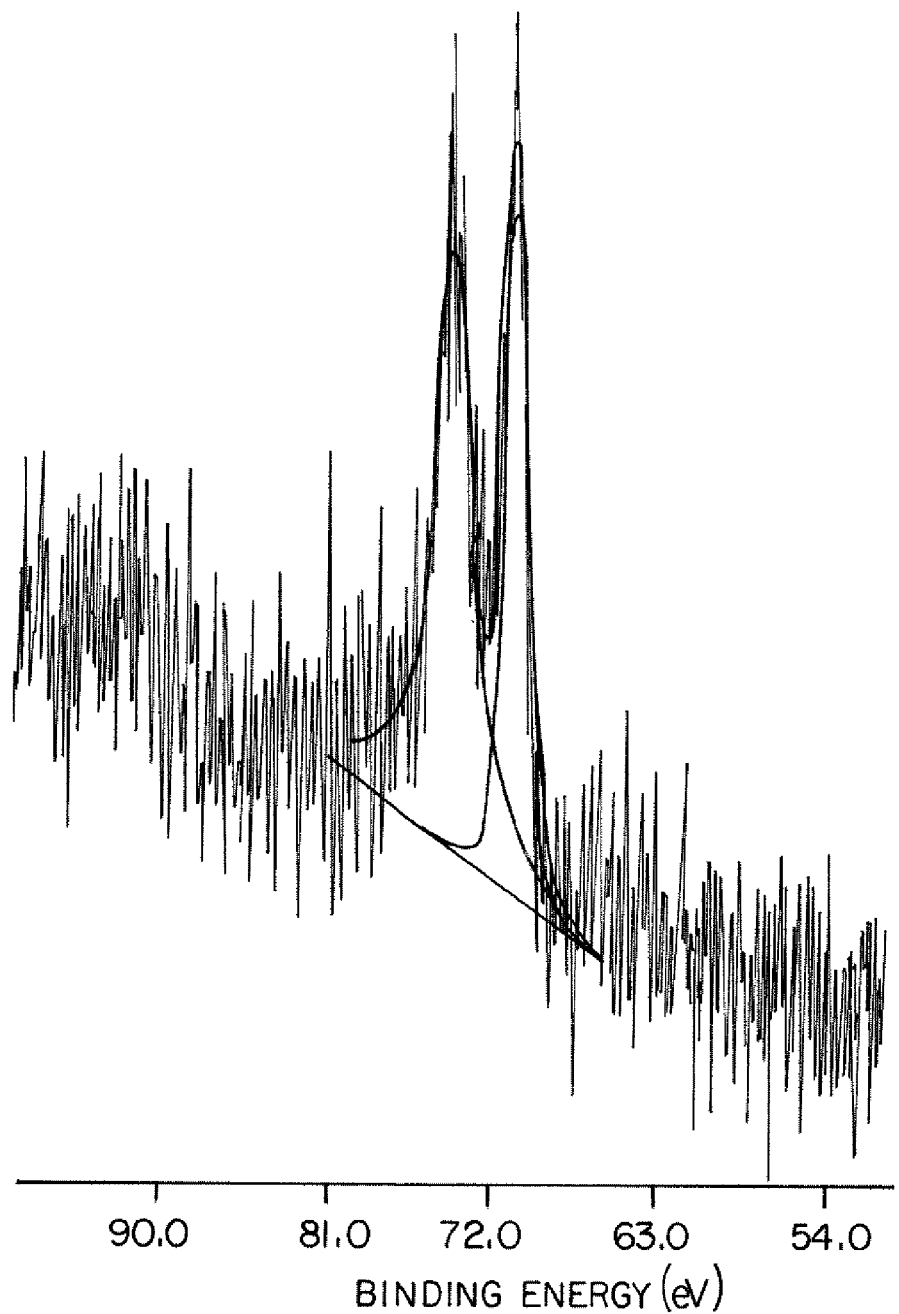
Figure 6A:
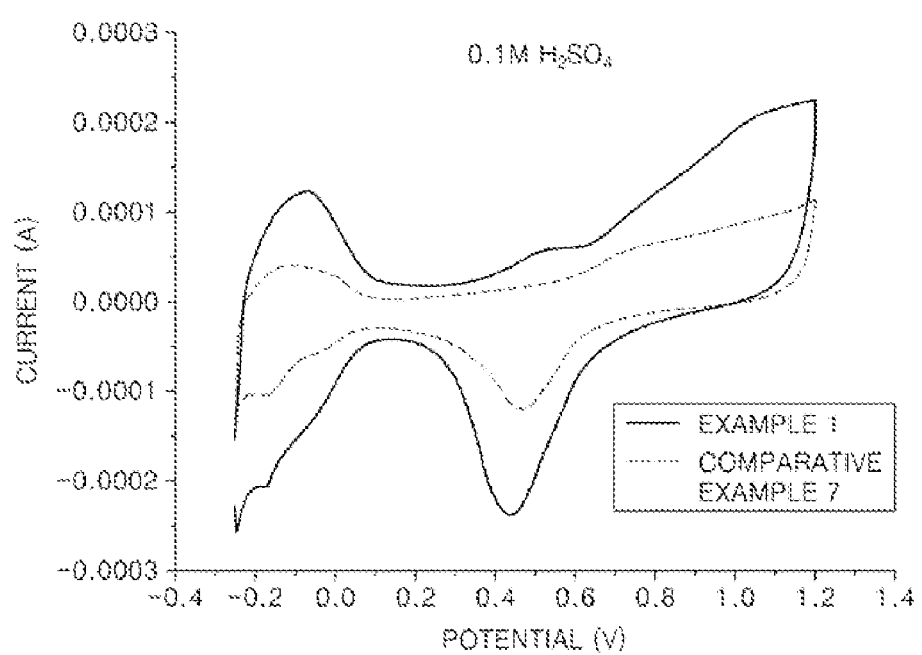
FIG. 6A is a graphical view of graphs of a current with respect to a voltage of supported catalysts prepared according to Example 1 and Comparative Example 1 in 0.1 M $H_2SO_4$ solution.
Figure 6B:
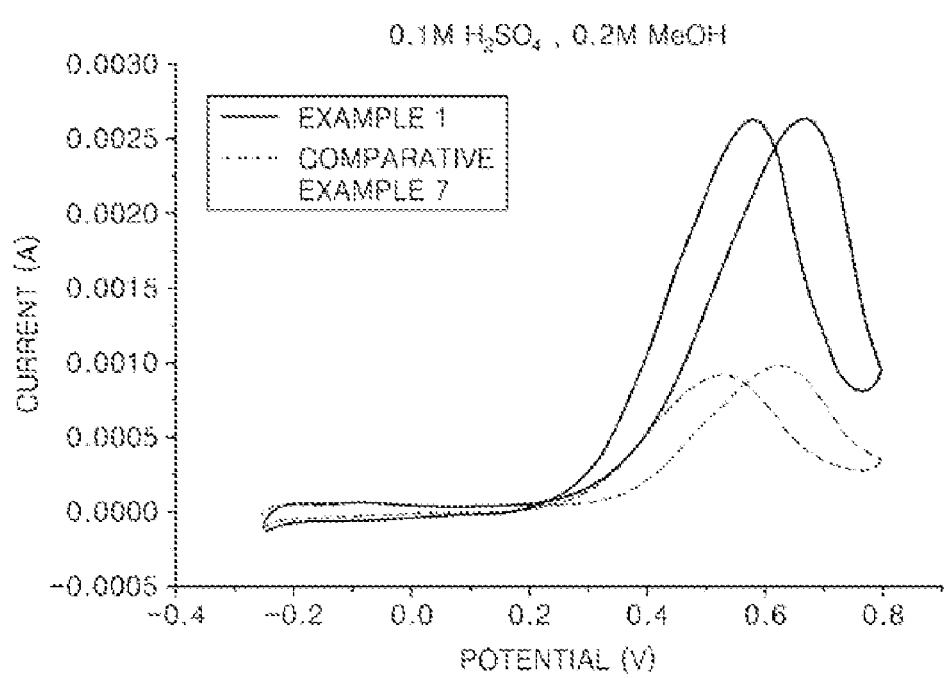
FIG. 6B is a graphical view of graphs of a current with respect to a voltage of supported catalysts prepared according to Example 1 and Comparative Example 1 in a blend solution of 0.1 M $H_2SO_4$ and 0.2M methanol.

FIG. 2A and 2B is a graphical view of an XRD spectrum of PtNiO/C prepared according to Example 1 and Comparative Example 1, respectively. FIG. 4 is a graphical view of a SEM-EDX spectrum of PtNiO/C prepared according to Example 1. FIG. 5A and 5B is a graphical view of an XPS spectrum of PtNiO/C prepared according to Example 1.

Referring to FIG. 2A, it was found that in PtNiO/C prepared according to Example 1, the particle size of Pt was about 2.3 nm and Pt was uniformly distributed. In addition, the XRD pattern of NiO/C before Pt was supported was not present in the XRD spectrum of PtNiO/C prepared according to Example 1. On the contrary the XRD pattern of NiO/C could be found in the XRD spectrum of PtNiO/C prepared according to Comparative Example 1. Therefore, it was found that the supported catalyst prepared according to Example 1 was prepared by supporting Pt with the metal oxide uniformly grown on the carbonaceous support, that is, the supported catalyst has a layered structure including a carbonaceous support (first layer), metal oxide (second layer), and Pt (third layer) as illustrated in FIG. 1.

Meanwhile, the oxidation state of the Ni compound was identified as NiO based on component analysis results illustrated in FIG. 4 and XPS results illustrated in FIG. 5A and 5B.

Example 2

Preparation of $PtTiO_2$/C Containing 60 wt % of PtTi in Atomic Ratio of 1:1

200 ml of ethanol and 50 ml of a nitric acid were mixed in a reaction vessel, 0.506 g of carbon black and 0.739 g of titanium chloride ($TiCl_4$) were added thereto, and then 25 ml of distilled water was added to the resultant mixture. Then, the resultant mixture to which distilled water was added was stirred at 240° C. for about 4 hours to obtain $TiO_2$/C.

The prepared $TiO_2$/C was distributed in a deionized water in a reaction vessel, and then, 2.0 g of 99% chloroplatinic acid ($H_2PtCl_6.6H_2O$) was dropped thereto and stirred at room temperature for 12 hours. Then, a solution prepared by dissolving NaOH and sodium borohydride that is a reducing agent in deionized water was dropped to the reaction vessel and reduced for 12 hours. Then, the reduction product was refined using a deionized water, and then was vacuum-dried at 80° C. for 12 hours in a vacuum oven. As a result, $PtTiO_2$/C containing 60 wt % of PtTi in an atomic ratio of 1:1 was prepared (Yield: 96%).

Example 3

Preparation of $PtTiO_2$/C Containing 60 wt % of PtTi in Atomic Ratio of 1:2

$TiO_2$/C was prepared in the same manner as in Example 2, except that 2.217 g of titanium chloride ($TiCl_4$) was used. The prepared $TiO_2$/C was distributed in a deionized water in a reaction vessel, and then, 2.0 g of 99% chloroplatinic acid ($H_2PtCl_6.6H_2O$) was dropped thereto and stirred at room temperature for 12 hours. Then, a solution prepared by dissolving NaOH and sodium borohydride that is a reducing agent in deionized water was dropped to the reaction vessel and reduced for 12 hours. Then, the reduction product was refined using a deionized water, and then was vacuum-dried at 80° C. for 12 hours in a vacuum oven. As a result, $PtTiO_2$/C containing 60 wt % of PtTi in an atomic ratio of 1:3 was prepared (Yield: 96%).

Example 4

Preparation of $PtTiO_2$/C Containing 60 wt % of PtTi in Atomic Ratio of 1:3

$TiO_2$/C was prepared in the same manner as in Example 2, except that 2.217 g of titanium chloride ($TiCl_4$) was used. The prepared $TiO_2$/C was distributed in a deionized water in a reaction vessel, and then, 2.0 g of 99% chloroplatinic acid ($H_2PtCl_6.6H_2O$) was dropped thereto and stirred at room temperature for 12 hours. Then, a solution prepared by dissolving NaOH and sodium borohydride that is a reducing agent in deionized water was dropped to the reaction vessel and reduced for 12 hours. Then, the reduction product was refined using a deionized water, and then was vacuum-dried at 80☐ for 12 hours in a vacuum oven. As a result, $PtTiO_2$/C containing 60 wt % of PtTi in an atomic ratio of 1:3 was prepared (Yield: 96%).

Example 5

Preparation of $PtTiO_2$/C Containing 60 wt % of PtTi in Atomic Ratio of 1:5

$TiO_2$/C was prepared in the same manner as in Example 2, except that 3.695 g of titanium chloride ($TiCl_4$) was used. The prepared $TiO_2$/C was distributed in a deionized water in a reaction vessel, and then, 2.0 g of 99% chloroplatinic acid ($H_2PtCl_6.6H_2O$) was dropped thereto and stirred at room temperature for 12 hours. Then, a solution prepared by dissolving NaOH and sodium borohydride that is a reducing agent in deionized water was dropped to the reaction vessel and reduced for 12 hours. Then, the reduction product was refined using a deionized water, and then was vacuum-dried at 80° C. for 12 hours in a vacuum oven. As a result, $PtTiO_2$/C containing 60 wt % of PtTi in an atomic ratio of 1:5 was prepared (Yield: 96%).

Figure 3:
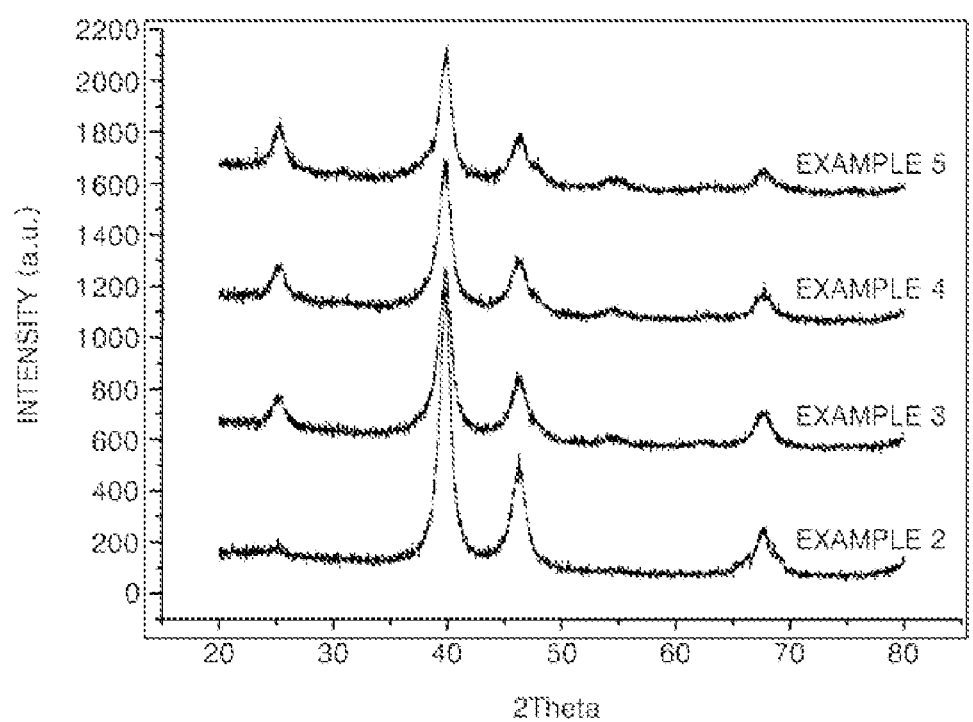
FIG. 3 is a graphical view of the XRD spectra of supported catalysts prepared according to Examples 2 through 5.

FIG. 3 is a graphical view of XRD spectra of supported catalysts containing Pt and Ti in various atomic ratios prepared according to Examples 2 through 5. Referring to FIG. 3, it was found that as the atomic ratio of the Ti oxide with respect to Pt increases, the diameter of Pt in the prepared supported catalyst decreases, and the XRD pattern of $TiO_2$ that does not support Pt appears.

Example 6

Preparation of $PtSnO_2/C$ Containing 60 wt % of PtSn in Atomic Ratio of 1:1

200 ml of ethanol and 50 ml of a nitric acid were mixed in a reaction vessel, 0.690 g of carbon black and 0.739 g of tin chloride ($SnCl_2$) were added thereto, and then 25 ml of distilled water was added to the resultant mixture. Then, the resultant mixture to which distilled water was added was stirred at 240° C. for about 4 hours to obtain $SnO_2/C$.

The prepared $SnO_2/C$ was distributed in deionized water in a reaction vessel, and then, 2.0 g of 99% chloroplatinic acid ($H_2PtCl_6.6H_2O$) was dropped thereto and stirred at room temperature for 12 hours. Then, a solution prepared by dissolving NaOH and sodium borohydride that is a reducing agent in deionized water was dropped to the reaction vessel and reduced for 12 hours. Then, the reduction product was refined using a deionized water, and then was vacuum-dried at 80° C. for 12 hours. As a result, $PtSnO_2/C$ containing 60 wt % of PtSn in an atomic ratio of 1:1 was prepared. (Yield: 97%)

Example 7

Preparation of $PtCeO_2/C$ Containing 60 wt % of PtCe in Atomic Ratio of 1:1

200 ml of ethanol and 50 ml of a nitric acid were mixed in a reaction vessel, 0.749 g of carbon black and 1.380 g of cerium nitrate ($Ce(NO_3)_3.6H_2O$) were added thereto, and then 25 ml of distilled water was added to the resultant mixture. Then, the resultant mixture to which distilled water was added was stirred at 240° C. for about 4 hours to obtain $CeO_2/C$.

The prepared $CeO_2/C$ was distributed in deionized water in a reaction vessel, and then, 2.0 g of 99% chloroplatinic acid ($H_2PtCl_6.6H_2O$) was dropped thereto and stirred at room temperature for 12 hours. Then, a solution prepared by dissolving NaOH and sodium borohydride that is a reducing agent in deionized water was dropped to the reaction vessel and reduced for 12 hours. Then, the reduction product was refined using a deionized water, and then was vacuum-dried at 80° C. for 12 hours. As a result, $PtCeO_2/C$ containing 60 wt % of PtCe in an atomic ratio of 1:1 was prepared. (Yield: 97%)

Example 8

Preparation of $PtWO_3/C$ Containing 60 wt % of PtW in Atomic Ratio of 1:1

200 ml of ethanol and 50 ml of a nitric acid were mixed in a reaction vessel, 0.797 g of carbon black and 1.545 g of tungsten chloride ($WCl_6$) were added thereto, and then 25 ml of distilled water was added to the resultant mixture. Then, the resultant mixture to which distilled water was added was stirred at 240° C. for about 4 hours to obtain $WO_3/C$.

The prepared $WO_3/C$ was distributed in deionized water in a reaction vessel, and then, 2.0 g of 99% chloroplatinic acid ($H_2PtCl_6.6H_2O$) was dropped thereto and stirred at room temperature for 12 hours. Then, a solution prepared by dissolving NaOH and sodium borohydride that is a reducing agent in deionized water was dropped to the reaction vessel and reduced for 12 hours. Then, the reduction product was refined using a deionized water, and then was vacuum-dried at 80° C. for 12 hours. As a result, $PtWO_3/C$ containing 60 wt % of PtW in an atomic ratio of 1:1 was prepared. (Yield: 98%)

Example 9

Preparation of PtNiO/C Containing 60 wt % of PtNi in Atomic Ratio of 1:1

2.0 g of 99% chloroplatinic acid ($H_2PtCl_6.6H_2O$), was completely dissolved with ethylene glycol in a reaction vessel, and then NiO/C prepared according to Example 1 was added thereto and strongly stirred at a reaction temperature of 160° C. for about 3 hours. The reaction product was separated into precipitant and a solution using a centrifuge. The precipitant was refined using deionized water. Then, reaction by-products were completely removed and then the resultant precipitant was dried at 80° C. for 12 hours in a vacuum oven. As a result, PtNiO/C containing 60 wt % of PtNi in an atomic ratio of 1:1 was obtained. (Yield: 96%).

Example 10

Preparation of PtNiO/C Containing 60 wt % of PtNi in Atomic Ratio of 1:1

PtNiO/C containing 60 wt % of PtNi in an atomic ratio of 1:1 was prepared in the same manner as in Example 1, except that instead of sodium borohydride, hydrazine was used as a reducing agent (Yield: 95%).

Example 11

Preparation of PtNiO/C Containing 80 wt % of PtNi in Atomic Ratio of 1:1

PtNiO/C containing 80 wt % of PtNi in an atomic ratio of 1:1 was prepared in the same manner as in Example 1, except that the amount of NiO/C was 0.485 g (Yield: 97%).

Example 12

Preparation of PtRuNiO/C Containing 60 wt % of PtRuNi in Atomic Ratio of 1:1:1

NiO/C (0.575 g) prepared according to Example 1 was distributed with a deionized water in a reaction vessel, and then 1.0 g of 99% chloroplatinic acid ($H_2PtCl_6.6H_2O$) and 0.49 g of ruthenium chloride 98% ($RuCl_3.3H_2O$) were added thereto and stirred at room temperature for 12 hours. Then, a solution prepared by dissolving sodium borohydride that is a reducing agent in deionized water was dropped to the reaction vessel and reduced for 12 hours. Then, the reduction product was refined using a deionized water, and then was vacuum-dried at 80° C. for 12 hours in a vacuum oven. As a result, PtRuNiO/C containing 60 wt % of PtRuNi in an atomic ratio of 1:1:1 was prepared. (Yield: 97%)

Example 13

Preparation of PtRuNiO/C Containing 60 wt % of PtRuNi in Atomic Ratio of 1:1:1

1.0 g of 99% chloroplatinic acid ($H_2PtCl_6.6H_2O$), 0.49 g of ruthenium chloride 98% ($RuCl_3.3H_2O$), and ethyleneglycol were added to a reaction vessel and completely dissolved. Then, 0.575 g of NiO/C prepared according to Example 1 was added to the resultant solution and strongly stirred at 160° C. for about 3 hours. The reaction product was separated into precipitant and a solution using a centrifuge. The precipitant was refined using deionized water. Then, reaction by-products were completely removed and then the resultant precipitant was dried at 80° C. for 12 hours in a vacuum oven. As a result, PtRuNiO/C containing 60 wt % of PtRuNi in an atomic ratio of 1:1:1 was obtained. (Yield: 96%).

Example 14

Preparation of $PtCo_2O_3$/C Containing 60 wt % of PtCo in Atomic Ratio of 1:1

200 ml of ethanol and 50 ml of a nitric acid were mixed in a reaction vessel, 0.578 g of carbon black and 1.124 g of Cobalt chloride ($CoCl_2.6H_2O$) were added thereto, and then 25 ml of distilled water was added to the resultant mixture. Then, the resultant mixture to which distilled water was added was stirred at 240° C. for about 4 hours to obtain $Co_2O_3$/C.

The prepared $Co_2O_3$/C was distributed in deionized water in a reaction vessel, and then, 2.0 g of 99% chloroplatinic acid ($H_2PtCl_6.6H_2O$) was dropped thereto and stirred at room temperature for 12 hours. Then, a solution prepared by dissolving NaOH and sodium borohydride that is a reducing agent in deionized water was dropped to the reaction vessel and reduced for 12 hours. Then, the reduction product was refined using a deionized water, and then was vacuum-dried at 80° C. for 12 hours. As a result, $PtCo_2O_3$/C containing 60 wt % of PtCo in an atomic ratio of 1:1 was prepared. (Yield: 97%)

Example 15

Preparation of PtAuNiO/C Containing 60 wt % of PtAuNi in Atomic Ratio of 1:1:1

NiO/C (0.700 g) prepared according to Example 1 was distributed with a deionized water in a reaction vessel, and then 1.0 g of 99% chloroplatinic acid ($H_2PtCl_6.6H_2O$) and 0.767 g of gold chloride 99% ($HAuCl_4.3H_2O$) were added thereto and stirred at room temperature for 12 hours. Then, a solution prepared by dissolving sodium borohydride that is a reducing agent in deionized water was dropped to the reaction vessel and reduced for 12 hours. Then, the reduction product was refined using a deionized water, and then was vacuum-dried at 80° C. for 12 hours in a vacuum oven. As a result, PtAuNiO/C containing 60 wt % of PtAuNi in an atomic ratio of 1:1:1 was prepared. (Yield: 98%)

Example 16

Preparation of PtOsNiO/C Containing 60 wt % of PtOsNi in Atomic Ratio of 1:1:1

NiO/C (0.691 g) prepared according to Example 1 was distributed with a deionized water in a reaction vessel, and then 1.0 g of 99% chloroplatinic acid ($H_2PtCl_6.6H_2O$) and 0.578 g of Osmium chloride 99% ($OsCl_3$) were added thereto and stirred at room temperature for 12 hours. Then, a solution prepared by dissolving sodium borohydride that is a reducing agent in deionized water was dropped to the reaction vessel and reduced for 12 hours. Then, the reduction product was refined using a deionized water, and then was vacuum-dried at 80° C. for 12 hours in a vacuum oven. As a result, PtOsNiO/C containing 60 wt % of PtOsNi in an atomic ratio of 1:1:1 was prepared. (Yield: 98%)

COMPARATIVE EXAMPLES

Comparative Example 1

Preparation of PtNiO/C Containing 60 wt % of PtNi in Atomic Aatio of 1:1

400 ml of ethanol and 100 ml of a nitric acid were mixed in a reaction vessel, 1.194 g of carbon black and 1.852 g of nickel chloride ($NiCl_2.6H_2O$) were added thereto, and then 50 ml of distilled water was added to the resultant mixture. Then, the resultant mixture to which distilled water was added was stirred at 240° C. for about 4 hours to obtain NiO/C. The prepared NiO/C was filtered, refined a few times using distilled water, and then vacuum-dried at 160° C. As a result, 0.7701 g of NiO/C was obtained (Yield: 76%). This experiment may be referred to in the reference "J. Phys. Chem. B 2005, 109, 8774-8778".

The prepared NiO/C was distributed in deionized water in a reaction vessel, and then, a chloroplatinic acid ($H_2PtCl_6.6H_2O$) was dropped thereto and stirred at room temperature for 12 hours. Then, a solution prepared by dissolving NaOH and sodium borohydride that is a reducing agent in deionized water was dropped to the reaction vessel and reduced for 12 hours. Then, the reduction product was refined using deionized water, and then was vacuum-dried at 80° C. As a result, PtNiO/C containing 60 wt % of PtNi in an atomic ratio of 1:1 was prepared (Yield: 95%).

Comparative Example 2

Preparation of $PtTiO_2$/C Containing 60 wt % of PtTi in Atomic Ratio of 1:1

$PtTiO_2$/C containing 60 wt % of PtTi in an atomic ratio of 1:1 was prepared in the same manner as in Comparative Example 1, except that $TiO_2$ was used instead of NiO (Yield: 95%).

Comparative Example 3

Preparation of $PtSnO_2$/C Containing 60 wt % of PtSn in Atomic Ratio of 1:1

$PtSnO_2$/C containing 60 wt % of PtSn in an atomic ratio of 1:1 was prepared in the same manner as in Comparative Example 1, except that $SnO_2$ was used instead of NiO (Yield: 95%).

Comparative Example 4

Preparation of $PtCeO_2$/C Containing 60 wt % of PtCe in Atomic Ratio of 1:1

$PtCeO_2$/C containing 60 wt % of PtCe in an atomic ratio of 1:1 was prepared in the same manner as in Comparative Example 1, except that $CeO_2$ was used instead of NiO (Yield: 95%).

Comparative Example 5

Preparation of PtWO$_3$/C Containing 60 wt % of PtW in Atomic Ratio of 1:1

PtWO$_3$/C containing 60 wt % of PtW in atomic ratio of 1:1 was prepared in the same manner as in Comparative Example 1, except that WO$_3$ was used instead of NiO (Yield: 95%).

Comparative Example 6

Preparation of PtNi/C Containing 60 wt % of PtNi in Atomic Ratio of 1:1

0.659 g of vulcan was dispersed in deionized water contained in a reaction vessel, and then 2.0 g of 99% chloroplatinic acid (H$_2$PtCl$_6$.6H$_2$O) and 0.926 g of nickel chloride (NiCl$_2$) were dropped thereto and stirred at room temperature for 12 hours. Then, a solution prepared by dissolving NaOH and sodium borohydride that is a reducing agent in deionized water was dropped to the reaction vessel and reduced for 12 hours. Then, the reduction product was refined using a deionized water, and then was vacuum-dried at 80° C. for 12 hours. As a result, PtNi/C containing 60 wt % of PtNi in an atomic ratio of 1:1 was prepared (Yield: 97%).

Comparative Example 7

Pt/C Johnson Matthey

Pt/C Johnson Matthey is a commercially available catalyst containing 60 wt % of Pt supported by a carbonaceous support.

Comparative Example 8

Preparation of PtRuNiO/C Containing 60 wt % of PtRuNi in Atomic Ratio of 1:1:1

1.0 g of 99% chloroplatinic acid (H$_2$PtCl$_6$.6H$_2$O), 0.49 g of ruthenium chloride 98% (RuCl$_3$.3H$_2$O), and ethyleneglycol were added to a reaction vessel and completely dissolved. Then, NiO prepared according to Example 1 and vulcan were added to the resultant solution and strongly stirred at 160° C. for about 3 hours. The reaction product was separated into precipitant and a solution using a centrifuge. The precipitant was refined using deionized water. Then, reaction by-products were completely removed and then the resultant precipitant was dried at 80° C. for 12 hours in a vacuum oven. As a result, PtRuNiO/C containing 60 wt % of PtRuNi in an atomic ratio of 1:1:1 was obtained. (Yield: 97%).

Comparative Example 9

Pt—Ru/C Johnson Matthey

Pt—Ru/C Johnson Matthey is a commercially available catalyst containing 60 wt % of Pt—Ru in atomic ratio of 1:1 supported by a carbonaceous support.

In Comparative Examples 1 through 9, before a catalyst metal was supported, metal oxide (MO$_x$C) supported by a carbonaceous support was refined so that the yield of the metal oxide (MO$_x$C) was decreased. Even when a metal oxide (MO$_x$) was prepared and refined, the yield of the metal oxide (MO$_x$) was decreased. As a result, it was difficult to control amounts of the metal oxide, the carbonaceous support, and the catalyst metal.

On the other hand, according to Example 1 to 16, amounts of initially added materials including a metal oxide precursor, a carbonaceous support, and a catalyst metal were maintained through the supported catalyst preparation process since the supported catalyst preparation process is performed in a single reaction vessel. In addition, since metal oxide was grown on the carbonaceous support, metal oxide could be uniformly distributed on the carbonaceous support, and thus, a supported catalyst having a three-layer structure according to the present invention was obtained. Furthermore, in the method of preparing a supported catalyst according to the present invention, even when a supported catalyst is mass-produced, reactions can be easily controlled and production costs can be reduced.

Table 1 shows the amount of an active metal supported, diameter of particles of the active metal, atomic ratio of atoms constituting the active metal, yield (wt %) of the supported catalyst measured using EDX, and current density of respective supported catalysts prepared according to Examples 1 through 16 and Comparative Examples 1 through 9.

TABLE 1

| System Catalyst | | Amount of Active Metal Supported (wt %) | Particle Diameter of Active Metal (nm) | Atomic Ratio | EDX (wt %) | Yield (%) | Current Density ($i_d$, A/g) |
|---|---|---|---|---|---|---|---|
| Example 1 | PtNiO/C | 60 | 2.3 | 1:1 | Pt(46), Ni(14) | 97 | 710 |
| Example 2 | PtTiO$_2$/C | 60 | 2.8 | 1:1 | Pt(48), Ti(12) | 96 | 350 |
| Example 3 | PtTiO$_2$/C | 60 | 2.5 | 1:2 | Pt(40), Ti(20) | 96 | 324 |
| Example 4 | PtTiO$_2$/C | 60 | 2.4 | 1:3 | Pt(35), Ti(25) | 96 | 295 |
| Example 5 | PtTiO$_2$/C | 60 | 2.2 | 1:5 | Pt(27), Ti(33) | 96 | 278 |
| Example 6 | PtSnO$_2$/C | 60 | 2.5 | 1:1 | Pt(37), Sn(23) | 96 | 467 |
| Example 7 | PtCeO$_2$/C | 60 | 2.7 | 1:1 | Pt(35), Ce(25) | 97 | 515 |
| Example 8 | PtWO$_3$/C | 60 | 2.9 | 1:1 | Pt(31), W(29) | 95 | 630 |
| Example 9 | PtNiO/C | 60 | 2.3 | 1:1 | Pt(46), Ni(14) | 97 | 650 |
| Example 10 | PtNiO/C | 60 | 3.1 | 1:1 | Pt(46), Ni(14) | 96 | 585 |
| Example 11 | PtNiO/C | 80 | 3.1 | 1:1 | Pt(61), Ni(19) | 96 | 605 |
| Example 12 | PtRuNiO/C | 60 | 1.8 | 1:1:1 | Pt(33), Ru(17), Ni(10) | 97 | 193 |
| Example 13 | PtRuNiO/C | 60 | 1.7 | 1:1:1 | Pt(33), Ru(17), Ni(10) | 95 | 175 |
| Example 14 | PtCo$_2$O$_3$/C | 60 | 2.2 | 1:1 | Pt(44), Co(16) | 97 | 705 |
| Example 15 | PtAuNiO/C | 60 | 2.2 | 1:1:1 | Pt(26), Au(26), Ni(8) | 98 | 680 |
| Example 16 | PtOsNiO/C | 60 | 2.1 | 1:1:1 | Pt(26), Os(26), Ni(8) | 98 | 594 |
| Comparative | PtNiO/C | 60 | 3.0 | 1:1 | Pt(46), Ni(14) | 96 | 415 |

TABLE 1-continued

| | System Catalyst | Amount of Active Metal Supported (wt %) | Particle Diameter of Active Metal (nm) | Atomic Ratio | EDX (wt %) | Yield (%) | Current Density ($i_d$, A/g) |
|---|---|---|---|---|---|---|---|
| Example 1 | | | | | | | |
| Comparative Example 2 | PtTiO$_2$/C | 60 | 3.2 | 1:1 | Pt(48), Ti(12) | 96 | 270 |
| Comparative Example 3 | PtSnO$_2$/C | 60 | 3.3 | 1:1 | Pt(37), Sn(23) | 96 | 339 |
| Comparative Example 4 | PtCeO$_2$/C | 60 | 3.4 | 1:1 | Pt(35), Ce(25) | 95 | 374 |
| Comparative Example 5 | PtWO$_3$/C | 60 | 3.6 | 1:1 | Pt(31), W(29) | 95 | 389 |
| Comparative Example 6 | PtNi/C | 60 | 3.4 | 1:1 | Pt(61), Ni(19) | 95 | 551 |
| Comparative Example 7 | Pt/C Johnson Matthey | 60 | 4.9 | — | Pt(60) | | 237 |
| Comparative Example 8 | PtRuNiO/C | 60 | 2.3 | 1:1:1 | Pt(33), Ru(17), Ni(10) | 97 | 135 |
| Comparative Example 9 | Pt—Ru/C Johnson Matthey | 60 | 2.6 | 1:1 | Pt(40), Ru(20) | | 88 |

Referring to Table 1, the size of particles of the active metal of respective supported catalysts prepared according to Examples 1 through 16 is less than the particle size of the active metal of the commercially available catalyst used according to Comparative Example 7. The particle size (2.3 nm) of Pt in the supported catalyst prepared according to Example 1 was smaller than each of the particle size (3.0 nm) of Pt in the supported catalyst prepared according to Comparative Example 1 and the particle size (4.9 nm) of Pt in a commercially available catalyst used according to Comparative Example 7, and thus, it was found that Pt in the supported catalyst prepared according to Example 1 was uniformly distributed. In addition, in consideration of the sizes of Pt in the supported catalysts prepared according to Examples 2 through 5, it was found that as an atomic ratio of Pt to metal oxide doped increases, the size of Pt decreases. FIG. 3 is a graphical view of XRD spectra of the supported catalysts prepared according to Examples 2 through 5.

In addition, even when the catalyst metal is an alloy of at least two metals or is a doped metal, the same effects as when the catalyst metal is a single metal occurred. That is, the size of particles of the active metal of respective supported catalysts prepared according to Examples 12 and 13 was smaller than the particle size of the active metal in each of the supported catalyst prepared according to Comparative Example 8 and the commercially available catalyst used according to Comparative Example 9, and thus it was found that the active metal of respective supported catalysts prepared according to Examples 12 and 13 was uniformly distributed.

The compositions, properties, and current densities of the supported catalysts prepared according to Examples 1 through 16 and Comparative Examples 1 through 9 were measured in the following manners.

Compositions

Amounts of components were measured using SEM-EDX (Brand Name: JEOL, JSM-6335F, at 200 kV), and chemical states of the obtained compositions were measured using XPS (Brand Name: MultiLab. ESCA 2000, Light source: Mg Kα, at 15 kV / 500 W).

Properties (Size of Particle of Catalyst Metal)

The crystallinity and crystal sizes of the catalysts were identified using XRD (Brand Name: Rigaku X-ray powder diffractometer, light source: Cu Kα at 40 kV/40 mA). The size of particles of the catalyst metal was obtained using a Pt 220 peak of the XRD pattern and Scherrer equation given by Equation 1. The results are shown in Table 1. In equation 1, L donates an average size of particles, $\lambda_{K\alpha1}$ donates an X-ray wavelength, $\theta_B$ denotes a θ value of 220 peak, and B$_{2\theta}$ denotes a θ range of the 220 peak.

$$L = \frac{0.94\lambda_{K\alpha1}}{B_{(2\theta)}\cos\theta_B} \qquad \text{[Equation 1]}$$

Current Density

An electrical activity was assessed using a current density with respect to a unit weight. 16 mg of respective supported catalysts prepared according to Examples 1 through 16 and Comparative Examples 1 through 9, 0.5 ml of 10 wt % Nafion solution, and 20 ml of three-times distilled water was mixed to prepare a catalyst slurry. 3 μl of the catalyst slurry was doped on a 2 mm-circular GC electrode. As a result, a half cell electrode was prepared. A performance test of the obtained half cell electrode was performed in a mixed solution of 0.2M methanol and 0.1M sulfuric acid aqueous solution and using a 3 electrode system (reference electrode: Ag, AgCl/KCl sat'd , counter electrode: platinum, gauze, 100 mesh, 99.9%, working electrode: GC Electrode) at 25° C. At this time, the scanning speed was 20 mV/sec.

The results are shown in Table 1. Referring to Table 1, Example 1 (710 A/g) showed 1.7 times performance than Comparative Example 1 (415 A/g) and 3 times higher performance than Comparative Example 7 (237 A/g) using a commercially available catalyst. Examples 12 and 13 using an alloy of Pt and Ru showed 1.4 times performance than Comparative Example 8 (135 A/g) and 2.2 times performance than Comparative Example 9 (88 A/g) using a commercially available catalyst.

Manufacturing Examples

Direct methanol fuel cells were produced using the supported catalysts prepared according to Examples 1 through 16 and Comparative Examples 1 through 9.

First, a carbon paper was prepared using a water-repellent treatment with a fluoro-based resin such as polytetrafluoroethylene. Onto the carbon paper, a microporous layer was introduced by spreading the mixture solution containing binder such as a polytetrafluoroethylene or Nafion, or inonomer and conductive carbonaceous material.

The supported catalyst prepared according to Example 1 and a small amount of Nafion solution were mixed and sprayed onto the gas diffusion layer, thereby obtaining a cathode. Then, an anode was obtained in the same manner as in Example 1, except that the supported catalyst prepared according to Comparative Example 9 was used instead of the supported catalyst prepared according to Example 1.

Then, a conductive polymer membrane (Nafion115 produced by Dufont Co.) was located between the cathode and the anode, and then heat and pressure were applied thereto to obtain a membrane electrode assembly (MEA). A fuel supply separation plate was disposed on the surface of the anode to supply fuel, that is, methanol, and an air supply separation plate was disposed on the surface of the cathode to supply gas, that is, air. The fuel was supplied from a fuel container through the fuel supply separation plate using a fuel pump, and the air was supplied through the air supply separation plate using an air pump. The performances of obtained unit cells were measured at room temperature.

In order to compare the unit cell using the supported catalyst prepared according to Example 1 to a unit cell using the commercially available supported catalyst prepared according to Comparative Example 7, a unit cell system was prepared in the same manner as described above, except that the cathode was prepared using the commercially available supported catalyst used according to Comparative Example 7 and the performance thereof was measured.

Figure 7:
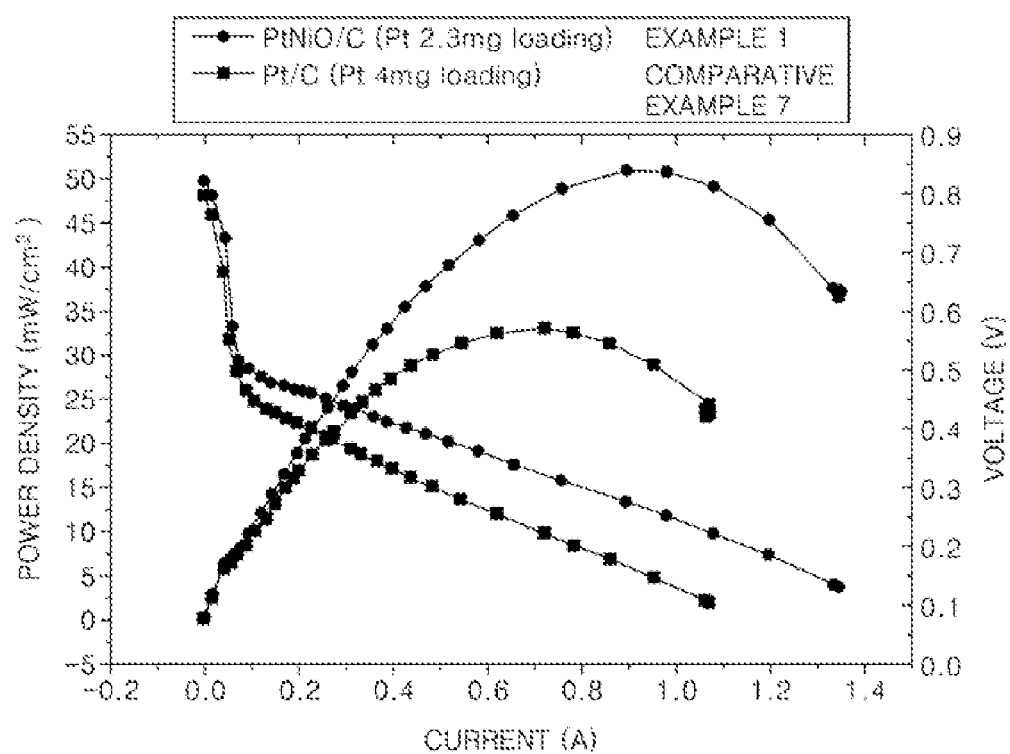
FIG. 7 is a graphical view of graphs of energy density and voltage with respect to a current of supported catalysts prepared according to Example 1 and Comparative Example 7.

FIG. 7 shows results of performance tests of the unit cells using the supported catalyst prepared according to Example 1 and Comparative Example 7.

Referring to FIG. 7, although the amount of Pt in the supported catalyst prepared according to Example 1 was ½ of the amount of Pt in the commercially available supported catalyst used according to Comparative Example 7, the unit cell obtained using the supported catalyst prepared according to Example 1 showed greater current density per unit area than the unit cell obtained using the commercially available supported catalyst used according to Comparative Example 7. Accordingly, it was found that a fuel cell including an electrode obtained using a supported catalyst according to the present invention shows better performance than a fuel cell including an electrode obtained using a known commercially available catalyst.

As described above, a supported catalyst for a fuel cell according to the present invention has excellent electrical activity, excellent durability, and low manufacturing costs. The supported catalyst can be mass-produced using a simple process. The membrane electrode assembly including the supported catalyst and a fuel cell including the membrane electrode assembly show excellent output densities and high performances.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A supported catalyst having a layered structure and sequentially comprising a first layer of carbonaceous support;
    a second layer of metal oxide formed upon the first layer; and
    a third layer of catalyst metal particles formed on the second layer, and
    wherein the catalyst metal is uniformly distributed at the surface of the carbonaceous support and the signal for the metal oxide is unobservable in the X-ray diffraction spectrum for the supported catalyst.

2. The supported catalyst of claim 1, wherein the metal oxide comprises at least one metal selected from the group consisting of a main catalyst metal, an alloy of a main catalyst metal and a co-catalyst metal, and a main catalyst metal doped with a co-catalyst metal.

3. The supported catalyst of claim 2, wherein the main catalyst metal is Pt, Au, Ru, or Os.

4. The supported catalyst of claim 2, wherein the co-catalyst metal comprises at least one metal selected from the group consisting of Ce, Ru, Sn, W, Ti, Mo, Fe, V, Mn, Co, Cr, Ni, Pd, Rh, and Ir.

5. The supported catalyst of claim 2, wherein when the catalyst metal is an alloy of a main catalyst metal and a co-catalyst metal, or a main catalyst metal doped with a co-catalyst metal, the atomic ratio of the main catalyst metal to the co-catalyst metal is in the range from 1:9 to 9:1.

6. The supported catalyst of claim 2, wherein when the catalyst metal is an alloy of a main catalyst metal and a co-catalyst metal, or a main catalyst metal doped with a co-catalyst metal, the weight ratio of the main catalyst metal to the co-catalyst metal is in the range from 0.3 to 20.

7. The supported catalyst of claim 1, wherein an average size of particles of the catalyst metal is in the range from 1.0 to 6.0 nm.

8. The supported catalyst of claim 1, wherein the amount of the catalyst metal is in the range from 10 to 1400 parts by weight based on 100 parts by weight of the carbonaceous support.

9. The supported catalyst of claim 1, wherein the metal oxide is represented by $MO_X$ or $MO_XC$ where x is in the range from 1 to 3, and M comprises at least one metal selected from the group consisting of Ce, Ru, Sn, W, Ti, Mo, Fe, V, Mn, Co, Cr, Ni, Pd, Rh, and Ir.

10. The supported catalyst of claim 1, wherein the amount of the metal oxide is in the range from 3 to 650 parts by weight based on 100 parts by weight of the carbonaceous support.

11. The supported catalyst of claim 1, wherein an average size of particles of the metal oxide is in the range from 1 to 50 nm.

12. An electrode for a supported catalyst comprising the supported catalyst of claim 1.

13. A membrane electrode assembly comprising the electrode of claim 12.

14. A fuel cell comprising the membrane electrode assembly of claim 13.

* * * * *